April 3, 1962  B. ERIKSSON  3,028,222
METHOD AND MEANS FOR HEAT EXCHANGE OF GASES
Filed Jan. 29, 1959  4 Sheets-Sheet 1

INVENTOR.
Bengt Eriksson

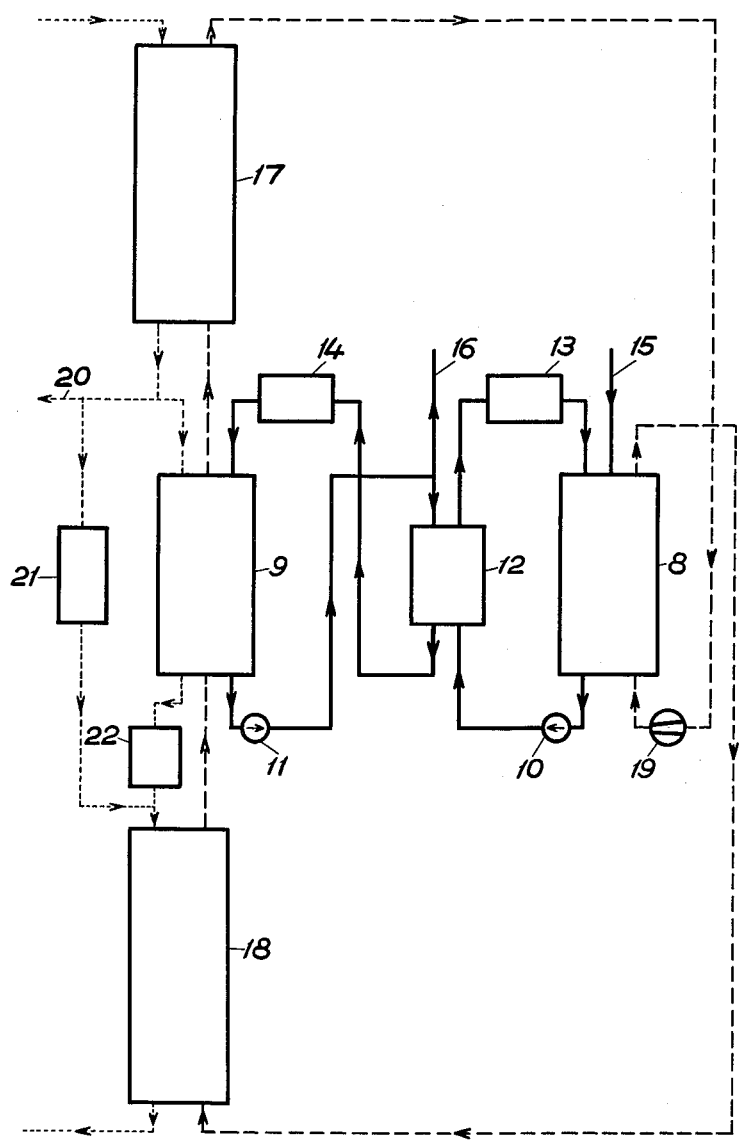

United States Patent Office 3,028,222
Patented Apr. 3, 1962

3,028,222
METHOD AND MEANS FOR HEAT EXCHANGE OF GASES
Bengt Eriksson, Vasteras, Sweden, assignor to Allmanna Svenska Elektriska Aktiebolaget, Vasteras, Sweden, a corporation of Sweden
Filed Jan. 29, 1959, Ser. No. 789,892
Claims priority, application Sweden Feb. 7, 1958
9 Claims. (Cl. 23—204)

This invention relates to a method and means for recovering heat in a process for manufacturing water, enriched with heavy water, by isotope exchange between a gas and water at two different temperatures.

The heavier forms of water HDO and $D_2O$ can be enriched in relation to the usual form, $H_2O$ by a so-called two temperature stage process comprising isotope exchange between, e.g. hydrogen sulphide and water at two different temperatures. A unit for manufacturing enriched water according to the method mentioned is schematically illustrated in FIGURE 1 of the accompanying drawing. The unit which works under pressure comprises in the main two enrichment parts comprising one tower 1, working at a low temperature and one tower 2, working at a higher temperature, or a group of towers connected in parallel and working at a low temperature and a group of towers, also connected in parallel and working at a higher temperature. The path of the water through the unit is marked out in continuous lines and that of the hydrogen sulphide in lines of short dashes. The equilibrium constant, $\alpha$, of the reaction between water, $H_2O$, and hydrogen sulphide, $H_2S$, and the simple deuterium forms of these compounds, HDO and HDS respectively is defined by the expression:

$$\alpha = \frac{[HDO][H_2S]}{[H_2O][HDS]}$$

This constant has a higher value at a low temperature, e.g. 2, 3 at 30° C. than at a higher temperature, e.g. 1, 9 at 100° C. When water is fed to the top of the cold tower at 3 and is met from below by hydrogen sulphide, which in the warm tower has been enriched with HDS, an exchange reaction takes place, which leads to the water supplied being enriched with HDO in such a way that some deuterium passes from the hydrogen sulphide to the water. A part of the water, enriched with heavy water, which leaves the cold tower, is withdrawn from the unit as product water at 4, while the principal part flows to the top of the warm tower at 5, where the water meets a stream of hydrogen sulphide, coming from below. Before it enters the bottom, 6, of the warm tower, this hydrogen sulphide comes from the cold tower where it has transmitted a part of its content of deuterium. As the equilibrium constant has a lower value at the temperature prevailing in the warm tower, deuterium will here pass from the enriched water to the hydrogen sulphide, which in that way will be enriched with HDS at the same time as the content of heavy water in the water falls. By supplying a suitable amount of natural water at the top of the cold tower and taking out a suitable amount of the enriched product at its bottom under carefully controlled conditions it is possible to obtain an equilibrium in the system at which state the content of heavy water in the warm water, leaving the unit at 7 is lower than the content of the water having been supplied at the top of the cold tower. The result of the process is that the water supplied to the unit, is removed from the system, after having transmitted a part of its content of heavy water, while the hydrogen sulphide is permanently circulating. The water, supplied to the cold tower can either be natural water or water already enriched.

By enrichment of heavy water according to the described method, the way in which the heat exchange problems are solved will be of great importance for the economy of the process. The water stream which leaves the bottom of the cold tower has to be heated before it is led to the top of the warm tower and the heat content of the water which leaves the unit must be recovered in a suitable manner. On the gas side, however, still greater quantities of heat are transferred because the cold gas, before it can be supplied to the bottom of the warm tower has not only to be heated but also to be saturated with water vapour. A corresponding quantity of heat is taken away from the gas, before it can be introduced into the bottom of the cold tower from the top of the warm tower.

The circumstances are complicated to a great extent by the water vapour present and also, if a conventional heat exchange in tube exchangers or similar apparatus could be used, in spite of the very large heat exchange surface which would be required among other things because of the great quantities of gas, such a process is rendered difficult by the fact that also if an effective counter-current process is used the two gas streams must be saturated with water vapour at each temperature in the heat exchanger, provided that no special supplementary equipment for the saturation of the gas with water vapour is incorporated in the system. On the gas cooling side such great problems do not exist, because the water vapour condenses, but on the gas heating side, the gas has to be in contact with water all the time and a complicated system with spray nozzles or the like for supplying water has to be arranged.

It is an object of this invention to efficiently and economically recover heat when manufacturing water, enriched with heavy water, by isotope exchange between a gas and water and two different temperatures.

It is another object of this invention to replace a heat exchange between gases by a heat exchange between fluids when enriching heavy water.

Another object of the invention is to provide an improved process for enriching heavy water.

Other objects of the invention will appear hereinafter.

According to this invention, the above-mentioned difficulties with the heat exchange on the gas side are avoided in such a way that gas heating as well as gas cooling takes place through direct contact between gas and circulating water. According to the invention the gas is cooled before introducing it into the cold enrichment part, by bringing it into counter-current direct contact with a stream of cold water, and the gas is heated before introducing it into the warm enrichment part by bringing it into counter-current direct contact with a stream of warm water, the quantities of water used for cooling and heating respectively than exchanging heat with each other. A complicated heat exchange process, gas-gas, has in this way been replaced by a conventional heat exchange process, fluid-fluid. The cooling and heating of the gas takes place in counter-current heat exchange towers, the water being then circulated through and in conduits round the towers. The heat exchanger for exchanging heat between the water quantities used for cooling and heating the gas can be of conventional type for exchanging heat between fluids.

The scope of the invention will be more readily apparent by reference to the following description when taken in conjunction with the accompanying illustrations, FIGURES 2 to 4 in which:

FIGURE 4 is another similar diagrammatic side elevational view, showing another modified unit suitable when using the method according to the invention.

Figure 1:
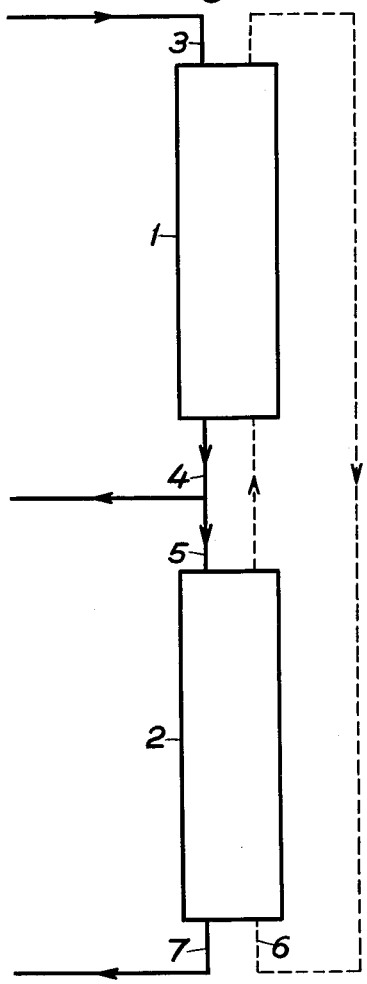

In the figures, the path of the gas is marked out in lines of short dashes, the water circulating through and round the heat exchange towers, in continuous lines, and the path of the process water in dotted lines. In the counter-current gas heating tower 8 in FIGURE 2, the cold gas meets a stream of water which is so adjusted that on the one hand it is capable of heating the gas to the desired temperature and saturating it with water vapour and on the other hand it is simultaneously cooled as far as possible. In the counter-current gas cooling tower 9, the case is the reverse in that the warm gas meets a stream of cold water which cools the gas to the required extent and is itself heated as far as possible. At the bottom of the gas heating tower a relatively cold stream of water leaves the tower. After heating, this stream of water is led back to the top of the tower. At the bottom of the gas cooling tower a relatively warm stream of water leaves the tower and after cooling, the stream is led back to the top of the tower. These two streams of water which are each circulated through and round one tower by the pumps 10 and 11 are equivalent in quantity and exchange heat with each other in a conventional heat exchanger 12, e.g. of tube or plate type. The warm water from the bottom of the gas cooling tower is led into this heat exchanger in counter-current with the cold water from the bottom of the gas heating tower and the need for external heating and cooling respectively has in this way been reduced to a considerable degree, also if a final adjustment of the temperatures of both streams has to be made before they are supplied to the top of each heat exchange tower. This final adjustment can, for example, be made in ordinary heat exchangers 13 and 14, working with water vapour (13) and cooling water (14) respectively as heating and cooling media. As the circulating gas takes up water vapour in the gas heating tower and emits water in the gas cooling tower a certain adjustment of the quantities of water in the circulation systems of both heat exchange towers will be necessary. The adjustment is represented by the water streams 15 and 16 in the figure. After the gas has been cooled in the gas cooling tower, it flows to the counter-current processing cold enrichment tower 17 and from there, via the gas heating tower, to the counter-current processing warm enrichment tower 18 and then back to the gas cooling tower. The circulation of the gas in the system is brought about by a blower 19. The process water is fed to the top of the cold enrichment tower, flows from the bottom, after a part of the enriched water has been withdrawn from the unit as product water at 20, via a heating equipment 21, to the top of the warm enrichment tower and is then drawn off from the unit at the bottom of the warm tower.

The heat exchange towers 8 and 9 are relatively short in comparison with the enrichment towers 17 and 18, but are somewhat greater in diameter. As the cost of gables and foundations for a short tower is relatively high in relation to the cost of the real tower, considerable amounts can be saved if each of the two heat exchange towers is built together with an enrichment tower. The gas cooling tower is then suitably built together with the cold enrichment tower, so that in construction it forms the lower part of the enrichment tower. In the same way, the gas heating tower is built together with the warm enrichment tower and forms its lower part. Besides lower gable and foundation costs such an arrangement also brings about the advantage that conduit arrangements are simplified to a considerable degree. FIGURE 3 illustrates a unit, in which the heat exchange towers and enrichment towers are built together in the described way. The different arrangements of the unit of FIGURE 3 are designated with the same numerals as the corresponding arrangements of the unit of FIGURE 2.

Figure 2:
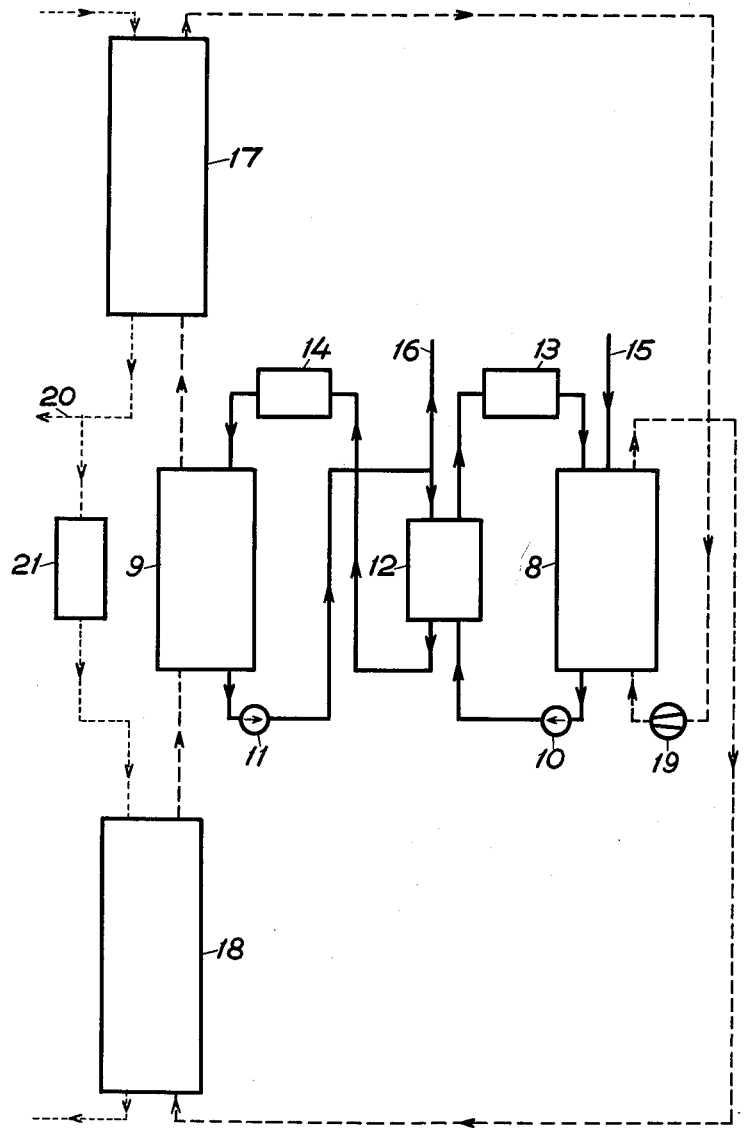
FIGURE 2 is a diagrammatic side elevational view, showing a unit suitable when using the method according to the invention.
Figure 3:
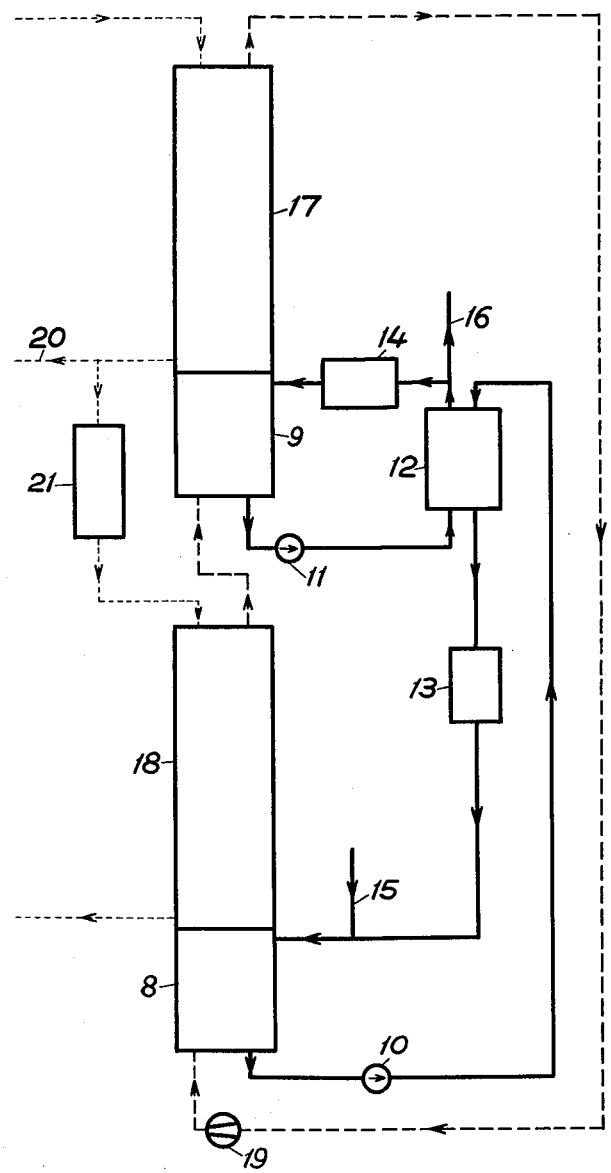
FIGURE 3 is a similar diagrammatic side elevational view, showing a modified unit suitable when using the method according to the invention.

FIGURE 4, in which the designations from FIGURES 2 and 3 have been retained, illustrates another enrichment unit, in which the heat exchange occurs with the method according to the invention. The cold water receives at its entrance in the heat exchange tower 9, water from the cold enrichment tower 17. The water stream, formed in this way, when leaving the tower 9 emits a quantity of water, corresponding to that received and that condensed in the tower, to the warm enrichment tower 18. At least a part of the cold process water then serves as cooling medium for the gas at the same time as it is itself heated to a temperature near to that prevailing in the warm enrichment tower. The temperature of the water is then finally adjusted in the heat arrangement 22. After the process water has passed the warm enrichment tower, its heat content is utilized in a suitable way before it leaves the system. Otherwise, the unit corresponds to that illustrated in FIGURE 2 and described earlier. Other arrangements as well as the method of circulating gas and the methods of circulating water streams through and round the heat exchange towers, are the same. Also when the apparatus is arranged so that the process water passes through the gas cooling tower, the construction of the enrichment towers and heat exchange towers together, brings about lower gable and foundation costs and simplified conduit arrangements compared with all the towers being built separately from each other.

The method of utilizing the process water for cooling the circulating gas in a heat exchange tower can be advantageous also for other arrangements than that described, and can for example be combined with other methods than that described for heating the gas before it enters the warm enrichment tower.

If the cold enrichment part of the unit comprises towers, connected in parallel and the warm enrichment part also comprises towers connected in parallel, the number of heat exchange towers can be either the same or less than the number of enrichment towers. At least in the first-mentioned case it is advantageous to place the enrichment towers on the top of the heat exchange towers as described earlier in connection with FIGURE 3. In an enrichment apparatus comprising several cold and warm enrichment towers and several gas cooling and gas heating towers, the heat exchange between the water streams circulating through and round the heat exchange towers can occur either so that a water stream circulating through and round each gas cooling tower is brought to exchange heat with a water stream circulating through and round each gas heating tower or so that a single water stream, which is spread through the gas cooling towers in branches connected in parallel, is brought to exchange heat with a single water stream which is spread through the gas heating towers in branches connected in parallel.

Instead of the gas, hydrogen sulphide, mentioned earlier, other gases, e.g. hydrogen and ammonia can also be used for enrichment of heavy water by use of the method according to the invention.

I claim:

1. In the process of producing water containing deuterium concentrated therein by exchanging, at two different temperatures, hydrogen with deuterium between water and hydrogen sulphide, the steps comprising: establishing a countercurrent flow of a first stream of water and the hydrogen sulphide in an exchange unit comprising at least one first and at least one second exchange vessel, by introducing the first stream of water into the first exchange vessel of the unit and passing the first stream of water therethrough, introducing a portion of the first stream of water passed through the first exchange vessel of the unit into the second exchange vessel of the unit and passing said portion of the first stream of water therethrough, and by introducing the hydrogen sulphide into the second exchange vessel of the unit and passing the hydrogen sulphide therethrough, introducing the hydrogen sulphide passed through the second exchange vessel of the unit into the first exchange vessel of the unit and passing the hydrogen sulphide therethrough, whereby the first stream of water and the hydrogen sulphide are mixed in each of said exchange vessels to cause an exchange of deuterium with hydrogen between them; maintaining the first exchange vessel of the unit at a temperature to cause the first stream of water flowing therethrough to become enriched and the hydrogen sulphide flowing therethrough to become impoverished with respect to deuterium; maintaining the second exchange vessel of the unit at a temperature to cause the hydrogen sulphide flowing therethrough to become enriched and the first stream of water flowing therethrough to become impoverished with respect to deuterium; withdrawing as product a portion of the first stream of water passed through the first exchange vessel of the unit and containing deuterium concentrated therein before at least the principal part of the remaining portion of the first stream of water is introduced into the second exchange vessel of the unit; heating the hydrogen sulphide before it is introduced into the second exchange vessel of the unit by bringing it in countercurrent direct contact with a second stream of water; cooling the hydrogen sulphide before it is introduced into the first exchange vessel of the unit by bringing it in countercurrent direct contact with a third stream of cooled water, and indirectly exchanging heat between said second and third streams of water.

2. In the process of producing water containing deuterium concentrated therein by exchanging, at two different temperatures, hydrogen with deuterium between water and a gas capable of containing each of hydrogen and deuterium, the steps comprising: establishing a countercurrent flow of a first stream of water and the gas in an exchange unit comprising at least one first and at least one second exchange vessel, by introducing the first stream of water into the first exchange vessel of the unit and passing the first stream of water therethrough, introducing a portion of the first stream of water passed through the first exchange vessel of the unit into the second exchange vessel of the unit and passing the portion of the first stream of water therethrough, and by introducing the gas into the second exchange vessel of the unit and passing the gas therethrough, introducing the gas passed through the second exchange vessel of the unit into the first exchange vessel of the unit and passing the gas therethrough, whereby the first stream of water and the gas are mixed in each of the said exchange vessels to cause an exchange of deuterium with hydrogen between them; maintaining the first exchange vessel of the unit at a temperature to cause the first stream of water flowing therethrough to become enriched and the gas flowing therethrough to become impoverished with respect to deuterium; maintaining the second exchange vessel of the unit at a temperature to cause the gas flowing therethrough to become enriched and the first stream of water flowing therethrough to become impoverished with respect to deuterium; withdrawing as product a portion of the first stream of water passed through the first exchange vessel of the unit and containing deuterium concentrated therein before at least the principal part of the remaining portion of the first stream of water is introduced into the second exchange vessel of the unit; heating the gas before it is introduced into the second exchange vessel of the unit by bringing it in countercurrent direct contact with a second stream of water; cooling the gas before it is introduced into the first exchange vessel of the unit by bringing it in countercurrent direct contact with a third stream of cooled water, and indirectly exchanging heat between said second and third streams of water.

3. A process as claimed in claim 2, in which the gas is cooled by bringing it into countercurrent direct contact with cooled water of a third stream of water in a gas cooling vessel, and a part of the first water stream which has passed through the first exchange vessel is passed through the gas cooling vessel in counter-current direct contact with the gas, before it is introduced into the second exchange vessel.

4. In the process of producing water containing deuterium concentrated therein by exchanging at two different temperatures, hydrogen with deuterium between water and hydrogen sulphide, the steps comprising: establishing a countercurrent flow of a first stream of water and the hydrogen sulphide in direct contact with each other in an exchange unit comprising at least one first and at least one second exchange vessel to cause an exchange of hydrogen with deuterium between the first stream of water and the hydrogen sulphide in each of the exchange vessels; maintaining the first exchange vessel of the unit at a temperature to cause the first stream of water flowing therethrough to become enriched and the hydrogen sulphide flowing therethrough to become impoverished with respect to deuterium; maintaining the second exchange vessel of the unit at a temperature to cause the hydrogen sulphide flowing therethrough to become enriched and the first stream of water flowing therethrough to become impoverished with respect to deuterium; withdrawing as product a portion of the first stream of water passed through the first exchange vessel of the unit and containing deuterium concentrated therein; heating the hydrogen sulphide before it is introduced into the second exchange vessel of the unit by bringing it in countercurrent direct contact with a second stream of water; cooling the hydrogen sulphide before it is introduced into the first exchange vessel of the unit by bringing it in countercurrent direct contact with a third stream of cooled water, and indirectly exchanging heat between said second and third streams of water.

5. In the process of producing water containing deuterium concentrated therein by exchanging, at two different temperatures, hydrogen with deuterium between water and a gas capable of containing each of hydrogen and deuterium, the steps comprising: establishing a countercurrent flow of a first stream of water and the gas in direct contact with each other in an exchange unit comprising at least one first and at least one second exchange vessel to cause an exchange of hydrogen with deuterium between the first stream of water and the gas in each of the exchange vessels; maintaining the first exchange vessel of the unit at a temperature to cause the first stream of water flowing therethrough to become enriched and the gas flowing therethrough to become impoverished with respect to deuterium; maintaining the second exchange vessel of the unit at a temperature to cause the gas flowing therethrough to become enriched and the first stream of water flowing therethrough to become impoverished with respect to deuterium; withdrawing as product a portion of the first stream of water passed through the first exchange vessel of the unit and containing deuterium concentrated therein; heating the gas before it is introduced into the second exchange vessel of the unit by bringing it in countercurrent direct contact with a second stream of water; cooling the gas before it is introduced into the first exchange vessel of the unit by bringing it in countercurrent direct contact with a third stream of cooled water, and indirectly exchanging heat between said second and third streams of water.

6. A process as claimed in claim 5 in which the gas is cooled by bringing it into countercurrent direct contact with cooled water of a third stream of water in a gas cooling vessel, and a part of the first water stream which has passed through the first exchange vessel is passed through the gas cooling vessel in countercurrent direct contact with the gas and led therefrom to the second exchange vessel.

7. In the process of producing water containing deuterium concentrated therein by exchanging, at two different temperatures, hydrogen with deuterium between water and hydrogen sulphide, the steps comprising: establishing a countercurrent flow of a first stream of water and hydrogen sulphide in direct contact with each other in at least one first exchange vessel; establishing a countercurrent flow of said first stream of water and hydrogen sulphide in direct contact with each other in at least one second exchange vessel; maintaining the first exchange vessel at a temperature to cause the first stream of water flowing therethrough to become enriched and the hydrogen sulphide flowing therethrough to become impoverished with respect to deuterium; maintaining the second exchange vessel at a temperature to cause the hydrogen sulphide flowing therethrough to become enriched and the first stream of water flowing therethrough to become impoverished with respect to deuterium; withdrawing as product a portion of the first stream of water passed through the first exchange vessel and containing deuterium concentrated therein; heating the hydrogen sulphide before introducing it into the second exchange vessel by bringing it in countercurrent direct contact with a second stream of water; cooling the hydrogen sulphide before introducing it into the first exchange vessel by bringing it in countercurrent direct contact with a third stream of cooled water, and indirectly exchanging heat between said second and third streams of water.

8. In the process of producing water containing deuterium concentrated therein by exchanging, at two different temperatures, hydrogen with deuterium between water and a gas capable of containing each of hydrogen and deuterium; the steps comprising: establishing a countercurrent flow of a first stream of water and the gas in direct contact with each other in at least one first exchange vessel; establishing a countercurrent flow of said first stream of water and the gas in direct contact with each other in at least one second exchange vessel; maintaining the first exchange vessel at a temperature to cause the first stream of water flowing therethrough to become enriched and the gas flowing therethrough to become impoverished with respect to deuterium; maintaining the second exchange vessel at a temperature to cause the gas flowing therethrough to become enriched and the first stream of water flowing therethrough to become impoverished with respect to deuterium; withdrawing as product a portion of the first stream of water passed through the first exchange vessel and containing deuterium concentrated therein; heating the gas before introducing it into the second exchange vessel by bringing it in countercurrent direct contact with a second stream of water; cooling the gas before introducing it into the first exchange vessel by bringing it in countercurrent direct contact with a third stream of cooled water, and indirectly exchanging heat between said second and third streams of water.

9. A process as claimed in claim 8 in which the gas is cooled by bringing it into countercurrent direct contact with cooled water of a third stream of water in a gas cooling vessel, and a part of the first water stream which has passed through the first exchange vessel is passed through the gas cooling vessel in countercurrent direct contact with the gas and led therefrom to the second exchange vessel.

References Cited in the file of this patent

UNITED STATES PATENTS

| | | |
|---|---|---|
| 2,787,526 | Spevack | Apr. 2, 1957 |
| 2,895,803 | Spevack | July 21, 1959 |